United States Patent [19]
Hosho et al.

[11] 4,038,957
[45] Aug. 2, 1977

[54] FUEL CONTROL SYSTEM FOR USE IN INTERNAL COMBUSTION ENGINE

[75] Inventors: Yukio Hosho; Hisanori Moriya, both of Katsuta, Japan

[73] Assignee: Hitachi, Ltd., Japan

[21] Appl. No.: 588,362

[22] Filed: June 19, 1975

[30] Foreign Application Priority Data

June 21, 1974 Japan .................. 49-70170

[51] Int. Cl.$^2$ .............................. F02M 59/00
[52] U.S. Cl. ................. 123/139 AW; 123/32 SP; 123/75 B; 123/127
[58] Field of Search ......... 123/75 B, 32 SP, 32 ST, 123/127, 139 AW

[56] References Cited

U.S. PATENT DOCUMENTS

| | | | |
|---|---|---|---|
| 2,502,574 | 4/1950 | Lee | 123/127 |
| 2,884,913 | 5/1959 | Heintz | 123/32 SP |
| 2,893,712 | 7/1959 | Huse | 123/139 AW |
| 2,894,735 | 7/1959 | Zupancic | 123/139 AW |
| 2,957,464 | 10/1960 | Dolza | 123/139 AW |
| 2,957,467 | 10/1960 | Ball | 123/139 AW |
| 3,824,965 | 7/1974 | Clawson | 123/32 SP |
| 3,884,197 | 5/1975 | Miyaki et al. | 123/32 SP |

*Primary Examiner*—Carroll B. Dority, Jr.
*Assistant Examiner*—David D. Reynolds
*Attorney, Agent, or Firm*—Craig & Antonelli

[57] ABSTRACT

A fuel control system for use in an internal combustion engine wherein the combustion device thereof comprises a main combustion chamber and an auxiliary combustion chamber provided therein with an ignition plug, the main and auxiliary combustion chambers communicating with each other through a through-hole. A rich mixture of gasified fuel and air is supplied to the auxiliary combustion chamber and a lean mixture of gasified fuel and air is supplied into the main combustion chamber and the mixture in the main combustion chamber is ignited by the flames produced in the auxiliary combustion chamber. A main air intake passageway and an auxiliary air intake passageway are provided and communicated respectively with the main combustion chamber and the auxiliary combustion chamber, and a fuel control system capable of varying the pressure for fuel supply in accordance with the negative pressure of a Venturi flume provided in the main air intake passageway and a fuel passageway for supplying the fuel controlled by said fuel control system to the main and auxiliary air intake passageways respectively at a predetermined distribution ratio, thereby making it possible to produce predetermined volumes of mixtures of gasified fuel and air respectively in the main and auxiliary air intake passageways.

5 Claims, 2 Drawing Figures

4,038,957

FUEL CONTROL SYSTEM FOR USE IN INTERNAL COMBUSTION ENGINE

BACKGROUND OF THE INVENTION

The present invention relates to a fuel control system for use in a so-called torch-ignition type international combustion engine wherein the combustion device thereof comprises a main combustion chamber and an auxiliary combustion chamber provided therein with an ignition plug, said main and auxiliary combustion chambers being in communication with each other through a through-hole. A rich mixture of gasified fuel and air is fed into the auxiliary combustion chamber and a lean mixture of gasified fuel and air is fed into the main combustion chamber, and the mixture of gasified fuel and air in the main combustion chamber is ignited by the combustion flame produced in the auxiliary combustion chamber.

It is known to be preferable as viewed from the point of view of purification of exhaust gases and the fuel consumption rate that in a torch-ignition type internal combustion engine, the mixture of gasified fuel and air fed into the auxliary combustion chamber must have a good ignitability throughout all of the operating conditions of the internal combustion engine and the mixture of gasified fuel and air fed to the main combustion chamber must be as lean as possible while still producing a desired level of output.

In the prior art, there has been proposed a fuel control system wherein carburetors for main and auxiliary combustion chambers respectively are provided at the same time, or a fuel control system wherein a fuel injection pump is provided for varying the fuel discharge rate dependent on the negative pressure in an air intake manifold which is in communication with the main combustion chamber.

However, the former fuel control system has disadvantages in that the amount of the mixture fed to the auxiliary combustion chamber is far less than that fed to the main combustion chamber, thus amounting to a ratio of 5 to 15 percent thereof to thereby make control of the fuel flow rate difficult, and that the fuel passageway leading to the auxiliary combustion chamber is so small in size as to cause such problems as vapor lock.

With the latter fuel control system, such problems as vapor lock do not occur, but it is difficult to maintain an air-fuel ratio at a desired level since the negative pressure in an air intake pipe is not proportional to the quantity of air flow passing through the air intake duct due to the fact that fuel control is performed dependent upon the negative pressure.

Further, although a fuel injection pump is used, the amount of the mixture fed to the auxiliary combustion chamber is very small as described above, so that the amount of fuel discharged from the injection pump at a time is extremely small. Accordingly, the latter fuel control system has disadvantages in that the production cost of the injection pump is very high, and in that any leakage in the injection pump causes a substantial change in the concentration of the mixture in the auxiliary combustion chamber with the result that the expected object can not be attained.

SUMMARY OF THE INVENTION

It is an object of the present invention to provide a fuel control system in which vapor lock is less possible and the air-fuel ratio of the mixtures can be accurately maintained at desired values.

The feature of the present invention resides in a fuel control system in which respective throttle valves are provided in main and auxiliary air intake ducts respectively communicating with main and auxiliary combustion chambers respectively, said throttle valves being operably associated with each other, said fuel under the pressure higher than atmospheric pressure are fed to said main and auxiliary air intake ducts dependent on the negative pressure at a Venturi flume portion provided upstream of the main throttle valve.

DESCRIPTION OF THE PREFERRED EMBODIMENT

Figure 1:
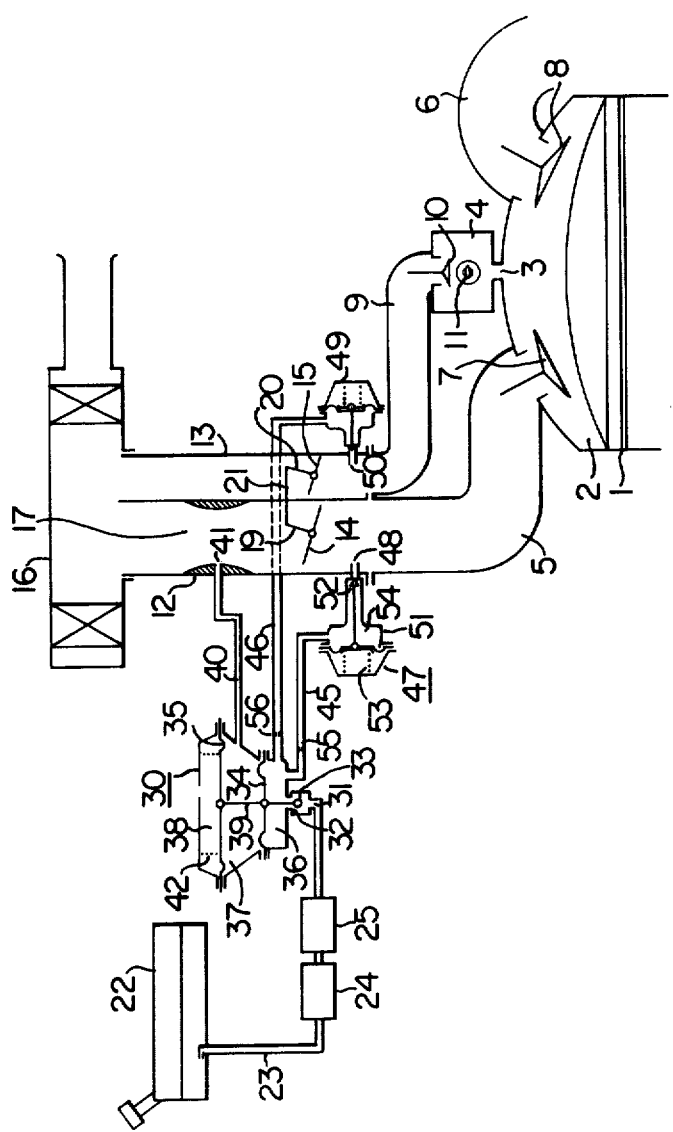
FIG. 1 is a cross-sectional view of the fuel control system according to an embodiment of the present invention.

The description will be given hereinafter for an embodiment according to the present invention with reference to the drawings. In FIG. 1, the numeral 1 designates a main body of an internal combustion engine, of which the head portion is provided therein with a main combustion chamber 2 and an auxiliary combustion chamber 4 communicating with said main combustion chamber 2 through a through hole 3. As usual with the conventional internal combustion engine, the main combustion chamber 2 is provided with an air intake port and an exhaust port respectively communicating with a main air intake passageway 5 and an exhaust gas passageway 6 respectively. Said air intake and exhaust ports are provided respectively with a main air intake valve 7 and a main exhaust valve 8 respectively, both of which are actuated by a well-known valve motion cam mechanism.

An auxiliary air intake port communicating with an auxiliary air intake passageway 9 is open to the auxiliary combustion chamber 4. Also provided at the auxiliary air intake port is an auxiliary air intake valve 10 actuated in synchronism with the main air intake valve 7. Furthermore, an ignition plug 11 is provided for igniting the mixture in the auxiliary combustion chamber.

A main air intake duct 12 is connected to the upstream portion of the main air intake passageway 5 and an auxiliary air intake duct 13 connected to the upstream portion of the auxiliary air intake passageway 9. In the respective air intake ducts are respectively provided main and auxiliary throttle valves 14 and 15 for regulating the amounts of air flow passing through the respective ducts, which throttle valves are connected to each other through levers 19, 20 and a rod 21. Accordingly, an operating force applied to the main throttle valve 14 by wellknown means is transmitted to the auxiliary throttle valve 15 through the lever 19, rod 21 and lever 20. The reference numeral 16 designates an air cleaner and 17 a Venturi flume provided upstream of the throttle valve 14 in the main air intake duct. The reference numeral 22 designates a fuel tank, the bottom portion of which is communicated with a fuel pump 24 through a fuel pipe 23. The discharge side of the fuel pump 23 is communicated with a fuel pressure control device 30 through a filter 25. A valve 33 and a valve seat 32 therefor are provided at a fuel inlet portion 31 of the fuel pressure control device 30. Furthermore, the interior of the fuel control device is divided into a fuel pressure control chamber 36, a negative pressure chamber 37 and an atmospheric pressure chamber 38 by two diaphragms 34 and 35 of different pressure-receiving areas. The fuel inlet portion 31 is communicated with the fuel pressure control chamber 36 through a valve port formed in the valve seat 32. The negative pressure chamber 37 is communicated with an opening 41 formed at the Venturi flume 17 through a negative pressure transmitting pipe 40.

The diaphragms 34 and 35 are connected to each other by a rod 39 which further extends downwardly and has the valve 33 fixedly secured to the lower end thereof. The diaphragm 34 is smaller than the diaphragm 35 in pressure-receiving area, and the rod 39 and the valve 33 fixedly secured thereto are adapted to be displaced downwardly with the rise of negative pressure (that is, as it comes close to a vacuum) in the negative pressure chamber 37. A displacement of the rod 39 varies depending on factors including the negative pressure in the negative pressure chamber 37, the pressure in the fuel pressure control chamber 36 and a resilient force produced by a spring 42 installed in the atmospheric pressure control chamber 36.

The fuel pressure control chamber 36 is in communication with main and auxiliary fuel passageways 45 and 46, respectively. The main fuel passageway 45 is communicated with a main injection nozzle 48 provided on the main air intake duct 12 through a main discharge or injection valve 47. The auxiliary fuel passageway 46 is communicated with an auxiliary injection nozzle 50 open to the auxiliary air intake duct 13 through an auxiliary discharge injection valve 49. The injection valve 47 comprises a diaphragm 51, a valve 52 connected to said diaphragm 51 and a spring 53 constantly biasing the diaphragm 51 and the valve 52 in the direction to close the valve. If the pressure of fuel fed to a pressure chamber 54 exceeds a predetermined value, the valve 52 is displaced to discharge fuel out of the injection nozzle. The reference numerals 55 and 56 designate fuel measuring jets provided respectively in the fuel passageways 45 and 46.

With the system as constructed above, when the internal combustion engine 1 is in operation, a negative pressure is developed in the Venturi flume 17 due to the air flow passing through the main air intake duct 12, which negative pressure is introduced into the negative pressure chamber 37 of the fuel pressure control device 30 through the negative pressure transmitting pipe 40. Consequently, an upward force produced at the diaphragms 34 and 35 causes said diaphragms to be displaced to the positions where they will be in balance with the biasing force of the spring 42 and causes the valve 33 to be displaced from the seat 32. As the result, the pressure in the control chamber 36 is maintained at a predetermined level, and the fuel measured by the measuring jets 55 and 56 are fed to the injection valves 47 and 49. Upon opening of the throttle valves 14 and 15, predetermined amounts of fuel are fed through the nozzles 48 and 50 into the main and auxiliary air intake ducts 12 and 13 respectively. In this case, the amounts of fuel fed into the respective air intake ducts are distributed in proportion to the inverse amount of fluid resistance of the respective passageways, because the fuel passageways 45 and 46 are both in communication with the same fuel pressure control chamber 36. Thus, if the sectional areas of the measuring jets 55 and 56 are determined to meet the fuel supplies required for respective air intake ducts, a predetermined proportional distribution of fuel can be fed into respective air intake ducts.

If the throttle valves 14 and 15 are opened during the operation of the engine, then the negative pressure created at the Venturi flume 17 is increased, which causes the negative pressure in the negative pressure chamber of the fuel pressure control device 30 to be increased. Hence, an upward force acts on the diaphragm 34 and a downward force acts on the diaphragm 35. Because the diaphragm 35 is larger than the diaphragm 34 in effective pressure-receiving area, the rod 39 is caused to be displaced downwardly, the valve 33 is displaced to a position further below the valve seat 32, and the flow of fuel into the fuel pressure control chamber 36 is increased, thus resulting in increased pressure in the fuel pressure control chamber 36. The flow rates of fuel through the measuring jets 55 and 56 are increased with rise of pressure in the control chamber 36, thereby increasing the absolute volumes of fuel supplied into respective air intake ducts 12 and 13 at a preset proportional distribution ratio.

Accordingly, if a preset opening degree ratio between the main and auxiliary throttle valves 14 and 15 is maintained, the ratios between the flow rate of air and that of fuel which are supplied into respective air intake ducts are fixed respectively at certain values. In other words, the mixtures of gasified fuel and air produced in the respective air intake ducts are each set at certain constant air-fuel ratios irrespective of the opening degrees of the throttle valves.

In the torch-ignition type engine, with some purposes, for example, of improving the starting performance, the necessity has been stressed for making richer the mixture of gasified fuel and air in the auxiliary combustion chamber during the starting operation of the engine, i.e., when the opening degrees of the throttle valves still remain lower. To meet such a necessity, if the opening degree of the auxiliary throttle valve is made low in relation to the opening degree of the main throttle valve, e.g., by the use of a cam in the interlocking mechanism of the main and auxiliary throttle valves, then the volume of air flowing through the auxiliary air intake duct 13 is decreased, but the volume of fuel as against the volume of air in the auxiliary air intake duct is increased and the mixture of gasified fuel and air becomes richer therein, because the volume of fuel to be supplied depends on the volume of air in the main air intake duct 12. It is indicated by this fact that concentration of the mixture of gasified fuel and air in the auxiliary air intake duct can be determined to have desired characteristics by changing the ratio of opening degrees between the main and auxiliary throttle valves through adjusting the interlocking mechanism of the main and auxiliary throttle valves (e.g., a cam is used in the interlocking mechanism and the shape and size of the cam are changed).

Figure 2:
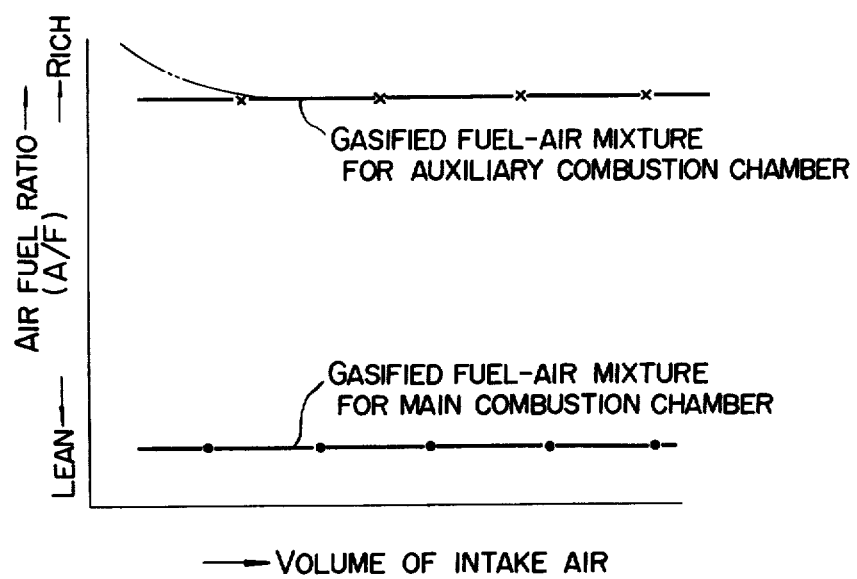
FIG. 2 is a characteristic curve diagram of air-fuel ratio of the mixtures to be fed.

In other words, referring to FIG. 2, which is a characteristic curve diagram of air-fuel ratio, it is possible to maintain at a certain air-fuel ratio the mixtures of gasified fuel and air for the main and auxiliary combustion chambers irrespective of the volumes of intake air and also to make richer the mixture of gasified fuel and air when the volume of intake air is low as shown by the chain line.

Furthermore, the air-fuel ratios for the main and auxiliary combustion chambers can be optionally determined within a certain limit depending on the sizes of the measuring jets 55 and 56, thereby making it possible to set optimum air-fuel ratios as required in the torch-ignition type internal combustion engine.

Referring to the embodiment in FIG. 1, the injection valves 47 and 49 provided respectively in the fuel passageways 45 and 46 are adapted to prevent the fuels in the fuel passageways 45 and 46 from being drawn out when the negative pressure downstream of the throttle valves 14 and 15 becomes higher at the time of coasting. Accordingly, if the injection nozzles 48 and 50 are disposed upstream of the throttle valves, said injection valves can be dispensed with.

As has been described above, according to the present invention the fuel flows through respective passageways under positive pressure (a pressure higher than atmospheric pressure) with the result that problems such as vapor lock never occur. Furthermore, the pressure for fuel supply is designed to be changed in accordance with the flow rate of air flowing through the main air intake duct, and hence, only one fuel pressure control device suffices. Moreover, the ratio of fuel supplied respectively to the main air intake duct and auxiliary air intake duct can be maintained at a certain value. Consequently, the air-fuel ratios of the mixtures of gasified fuel and air for respective combustion chambers can be maintained at desired values.

Furthermore, when the system constructed according to the present invention is applied to a multi-cylinder type internal combustion engine, air flowing through the air intake ducts form continuous flows and the fuel also form continuous flows, thus resulting in improved accuracy in the measurement of fuel.

In the use of the conventional injection pump, even if said pump is applied to a multi-cylinder type internal combustion engine, deliveries of the injection pump will be made intermittently and there is such a danger that variations in the delivery rate may directly result in fluctuations in the air-fuel ratios. However, according to the present invention the mixtures of gasified fuel and air produced are distributed into respective air intake ducts, with the result that the accuracy is greatly improved as compared with the conventional pump.

Additionally, according to this invention the measurement of fuel is carried out by means of the jet 55 and 56 fixedly mounted, and control of fuel is performed by means of the diaphragms shifted by the action of negative pressure in the Venturi flume. Hence, there are few sliding contact portions, and moreover, problems such as fuel leakage are eliminated, thus resulting in increased service life of the entire system.

What is claimed is:

1. A fuel control system for use in an internal combustion engine wherein the combustion device thereof comprises a main combustion chamber and an auxiliary combustion chamber provided therein with an ignition plug, the main and auxiliary combustion chambers being in communication with each other through a through-hole and the mixture of gasified fuel and air in the main combustion chamber being ignited by the flames of combustion produced in said auxiliary combustion chamber, characterized in that throttle valves operationally associated with each other are provided respectively in a main air intake duct in communication with the main combustion chamber and in an auxiliary air intake duct in communication with the auxiliary combustion chamber, fuel pressure booster means for supplying fuel boosted to a pressure higher than atmospheric pressure, fuel pressure control means for varying the pressure of the fuel supplied from said fuel pressure booster means in accordance with the negative pressure at a Venturi flume provided upstream of the throttle valve in said main air intake duct first and second fuel passageways connected to said fuel pressure control means for supplying the fuel controlled by said fuel pressure control means respectively to the main and auxiliary air intake ducts, and first and second discharge valves connecting said respective first and second fuel passageways to said main and auxiliary air intake ducts, the opening degrees of said respective discharge valves being set to maintain the pressure of fuel upstream of the discharge valves constant.

2. A fuel control system as defined in claim 1, arranged such that fuel measuring jets are disposed in each of said first and second fuel passageways respectively communicating between the fuel pressure control means and the main air intake duct and between said fuel pressure control means and the auxiliary air intake duct, and the ratio between volumes of fuel supplied into the main air intake duct and the auxiliary air intake duct is maintained at a certain value.

3. A fuel control system for use in an internal combustion engine of the type having a main combustion chamber and an auxiliary combustion chamber communicating with said main combustion chamber by way of a through-hole and wherein a main air intake duct is connected to said main combustion chamber to supply a mixture of gasified fuel and air thereto and an auxiliary air intake duct is connected to said auxiliary combustion chamber for supplying a mixture of gasified fuel and air thereto, throttle valves operationally associated with each other disposed respectively in said main and auxiliary air intake ducts, a Venturi flume disposed in said main air intake duct upstream of said throttle valve therein, and an ignition plug provided in said auxiliary combustion chamber for igniting the mixture of gasified fuel and air therein which ignites the mixture of gasified fuel and air in said main combustion chamber, said fuel control system comprising fuel pressure booster means for supplying fuel at a pressure higher than atmospheric pressure, fuel pressure control means for varying the pressure of the fuel supplied from said fuel pressure booster means in accordance with the negative pressure at said Venturi flume, first and second fuel passageways connected between said fuel pressure control means and said main and auxiliary air intake ducts, respectively, and first and second fuel measuring jets disposed in said first and second fuel passageways, respectively, and being dimensioned to maintain the volumes of fuel supplied to said main and auxiliary air intake ducts at a fixed ratio.

4. A fuel control system according to claim 3 wherein said fuel pressure control means comprises a device having three chambers separated by interconnected flexible wall diaphragms, one of said chambers being connected to atmosphere, a second chamber being connected to said main air intake duct in said Venturi flume and the third chamber being connected to said fuel pressure booster means and to said first and second fuel passageways, and valve means connected to said wall diaphragms for controlling the volume of fuel supplied to said third chamber from said fuel pressure booster means.

5. A fuel control system according to claim 4 wherein said first and second fuel passageways are connected to said main and auxiliary air intake ducts by way of respective first and second discharge valves the opening degrees of which are set to maintain the pressure of fuel upstream of the discharge valves constant.

* * * * *